United States Patent [19]

Floury et al.

[11] Patent Number: 5,236,145
[45] Date of Patent: Aug. 17, 1993

[54] REEL FOR PACKAGING A CONDUCTOR

[75] Inventors: Yves Floury, Mareil-Marly; Luc Lebouc, Sartrouville; Guy Deschampes, Caudry, all of France

[73] Assignee: Nestor Basquin SA, Caudry Cedex, France

[21] Appl. No.: 834,873

[22] Filed: Feb. 13, 1992

[30] Foreign Application Priority Data

Feb. 14, 1991 [FR] France ................... 91 01742

[51] Int. Cl.$^5$ ............... B65H 75/14; B65H 75/22
[52] U.S. Cl. ........................ 242/116; 242/118.61
[58] Field of Search ............ 242/115, 116, 118.6, 242/118.61, 77

[56] References Cited

U.S. PATENT DOCUMENTS

| | | | |
|---|---|---|---|
| 1,856,298 | 5/1932 | Traver | 242/118.6 |
| 3,552,677 | 1/1971 | Hacker | 242/118.61 |
| 3,584,819 | 6/1969 | Brough | 242/118.61 |
| 3,696,438 | 9/1987 | Myers | 242/118.41 |
| 3,940,086 | 2/1976 | Stoquelet | 24/118.6 |
| 4,387,863 | 6/1983 | Edmonston et al. | 242/118.4 |
| 4,657,203 | 4/1987 | Crawford | 242/125.1 |

FOREIGN PATENT DOCUMENTS 223113 12/1974 France.
451873 8/1936 United Kingdom .......... 242/118.61

*Primary Examiner*—William A. Cuchlinski, Jr.
*Assistant Examiner*—C. W. Fulton
*Attorney, Agent, or Firm*—Sughrue, Mion, Zinn, Macpeak & Seas

[57] ABSTRACT

The reel comprises a core and two identical end plates fitted in and assembled on the core. It is characterized in that each one-piece end plate (2) has a cylindrical support (6) on its inside face, which support fits into the core (1), and a reserve housing (20) in its outside face, which housing communicates with the periphery of the core, and in that the core has an inside bevelled surface (5) of limited angle (b) on each of its ends Application: packaging optical fibers or electrical conductors.

10 Claims, 2 Drawing Sheets

FIG.3
FIG.4
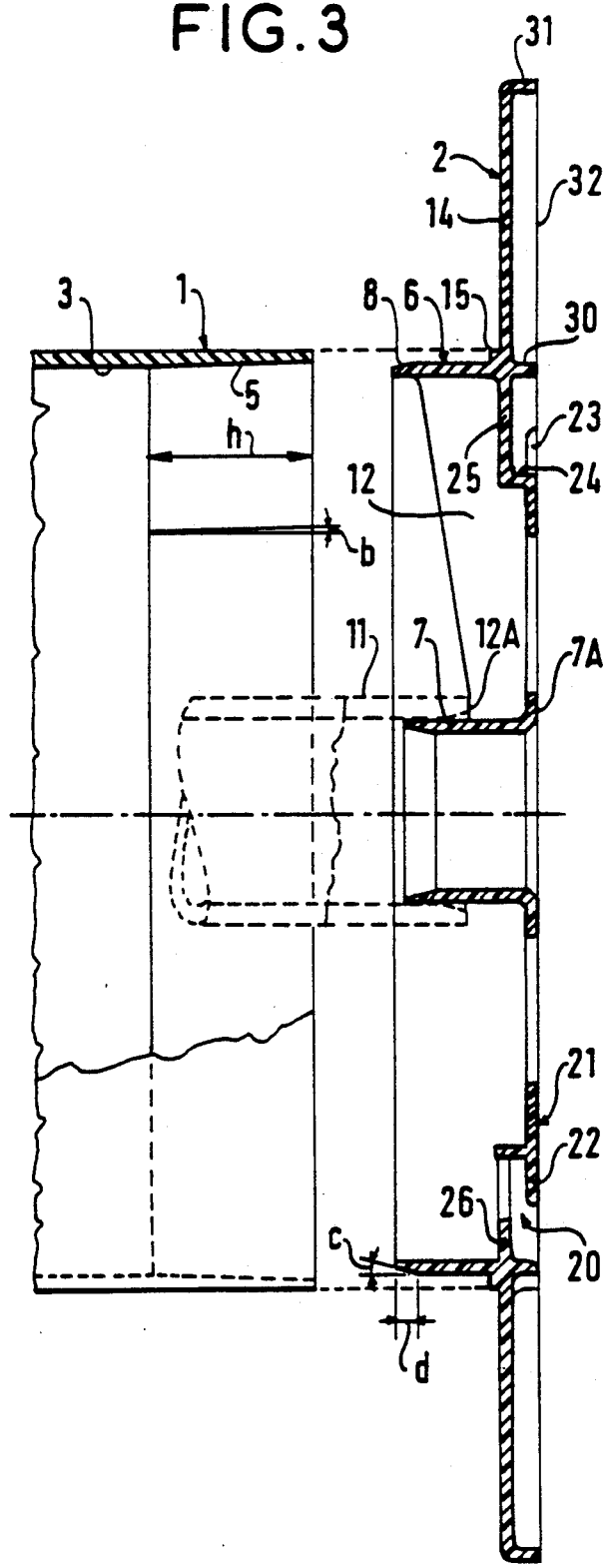
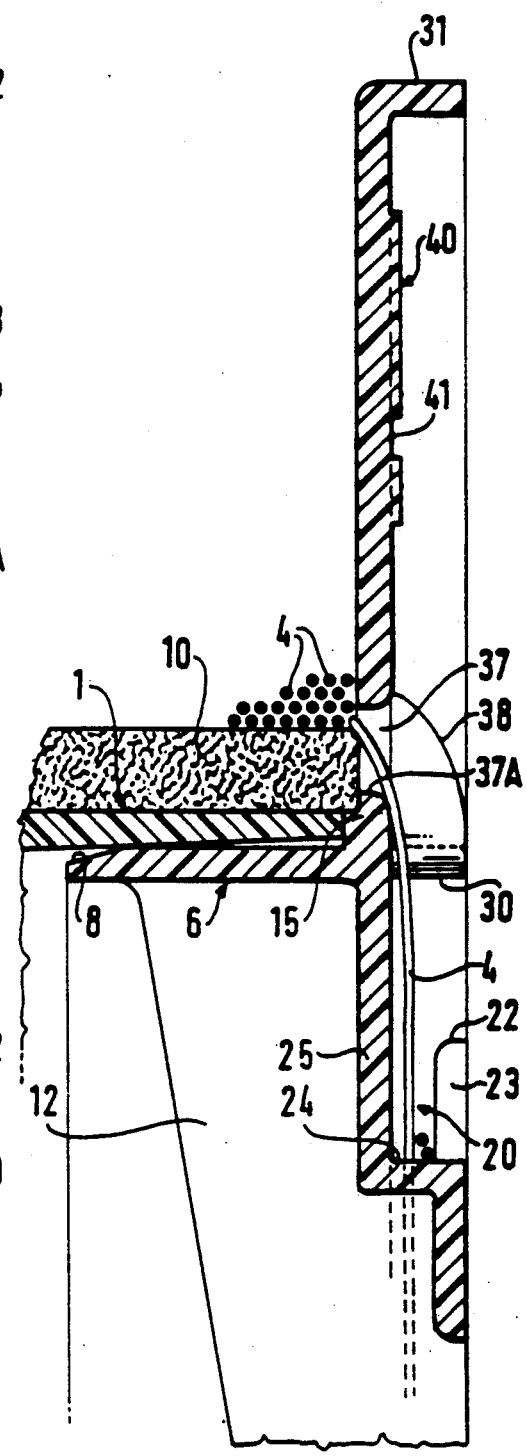

REEL FOR PACKAGING A CONDUCTOR

The present invention relates to reels used for packaging very large lengths of conductor, particularly electrical conductors, and more particularly optical fibers.

Reels for packaging electrical or optical conductors are already widely used for storing and delivering large lengths of conductor. Such a reel comprises a cylinder or core having two end plates which retain the conductor wound on the cylinder between them.

Such reels are described in particular in Documents FR-A-2 231 136, U.S. Pat. No. 4,657,203, and U.S. Pat. No. 3,584,819.

In Document FR-A-2 231 136, the end plates are made independently from the core, and they fit onto the ends of the core. Each end plate is itself constituted by a plate and a half-hub. The half-hub has a cylindrical support which fits into the bore of the core, and a peripheral flange which is set into a recess provided for this purpose in the outside face of the plate as assembled on the core. The plate is held in place on the end of the core by the half-hub. A hole in the flange is provided in the proximity of the support to allow the inside end of the conductor wound on the core to pass through the flange.

In Document U.S. Pat. No. 4,657,203, the reel is made in one piece, the end plates merely projecting beyond the periphery of the cylinder at the ends thereof. The cylinder has a spindle from which axial ribs extend radially, which axial ribs connect the spindle to the cylinder, preferably over the length of the cylinder. At one end of the cylinder, each of the ribs has a notch opening out radially in its edge. The cylinder has an opening at this end to allow the inside end of the conductor wound on the cylinder to pass through, the inside end having extra length for this purpose. The extra length is stored in the notches in the edges of the various ribs. A cover fitted onto the ribs closes the notches and protects the stored extra length of the inside end.

In Document U.S. Pat. No. 3,584,819, the reel comprises two end plates made independently from the core and fitted onto the ends of the core. Each end plate has an annular shoulder which is inserted into the end of the core, and an axial hole in the thickest, shoulder portion of the plate. The inside surface of the core is slightly bevelled, flaring from its middle portion. The shoulders of the end plates are fitted to the ends of the core, and are retained therein by friction and/or by glueing.

The reels described in the first and third documents offer the advantage of being compact to transport and to store before they are used. However, a reel as described in the first document is relatively complex to make, with its three different types of parts assembled together. A reel as described in the third document is relatively heavy. The reels as described in either of those two documents are not entirely satisfactory for packaging optical fibers which can become stuck between the core and the end plates and which have the inside ends of their windings unprotected.

Reels such as the reel described in the second document enable optical fibers to be stored satisfactorily. However, they are not compact to transport and to store before they are used. Manufacturing them remains relatively complex and is therefore expensive.

An object of the present invention is to provide reels offering the advantages of the three above-mentioned types of reel, without suffering from their drawbacks.

The invention provides a reel for packaging a conductor, said reel comprising a tubular core and two identical end plates assembled onto said core, in which reel each end plate is made in one piece and has projecting fitting means on an "inside" one of its faces for fitting the end plate into the bore of the core, and said core has "inside" bevelled surfaces on its "inside" face, said reel being characterized in that said inside bevelled surfaces extend over the end portions only of the core and are of limited angle lying in the range of one degree to a few degrees, and preferably one degree to two degrees, and in that said fitting means are constituted by a first cylindrical support of outside diameter substantially equal to the mean inside diameter of each of the bevelled ends of said core.

Said reel further has any one of the following characteristics:

each end plate includes a second cylindrical support inside and coaxial to said first support and projecting from said inside face, a set of uniformly-distributed axial fins connecting said first support to said second support, and a flange at the periphery of said first support, said flange being plane on the inside face of the end plate, except where it meets the first support and forms a circular abutment shoulder of width corresponding to the thickness of said core;

on its outside face, each end plate further has:

a toothed ring extending in the plane of the outside edges of said fins which connect said ring to said second support, said toothed ring having teeth distributed uniformly around it periphery and disposed alternately with notches, and delimiting a first discontinuous end wall of a reserve housing in the end plate;

a continuous circular shoulder on said toothed ring at the bottom of said notches, which circular shoulder constitutes the bottom of said reserve housing and truncates the end portion of the outside edge of each of said fins via a corresponding shoulder at the first support end of the fin;

a set of radial tabs on the truncated end portion of the outside edge of each of said fins, which set constitutes a second discontinuous end wall of said reserve housing; and a hole in said flange of the end plate making said reserve housing communicate with the periphery of the core; and two circular ribs delimit said flange on the outside face of the end plate, and radial ribs distributed uniformly between said circular ribs divide the flange into trapezium-shaped boxes, one of the boxes being made twice the size of each of the others by means of a missing radial rib, and being used for identifying the reel.

The characteristics and the advantages of the present invention appear clearly from the following description of a preferred embodiment shown in the accompanying drawings, in which:

FIG. 3 is a fragmentary section view on a larger scale of the reel shown in FIGS. 1 and 2, the section being taken on lines III—III shown in FIG. 2;

FIG. 4 is a fragmentary section view on a larger scale than FIGS. 1 and 2 and than FIG. 3, of a detail of the reel, the section being taken on line IV—IV shown in FIG. 2.

Figure 2:
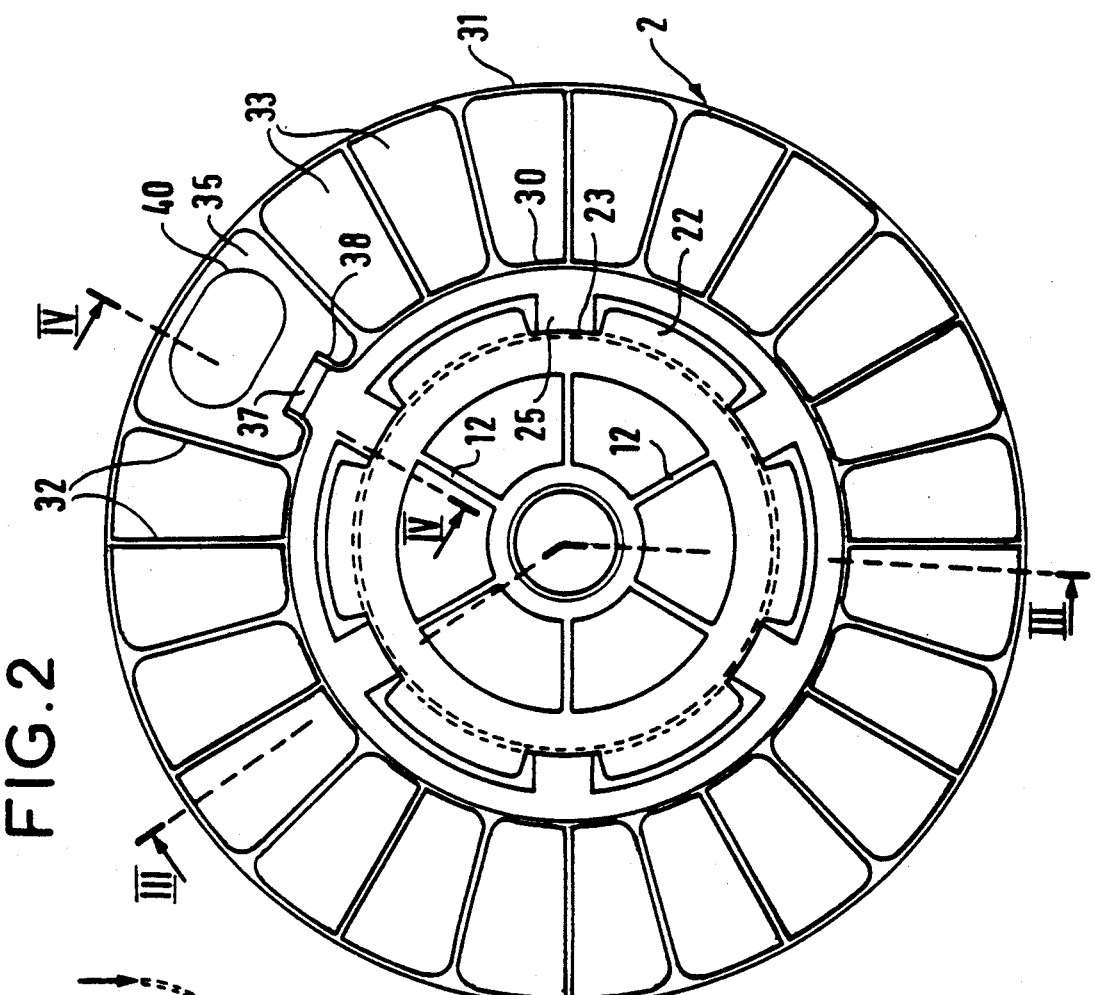
FIG. 2 is an end view of the reel.
Figure 1:
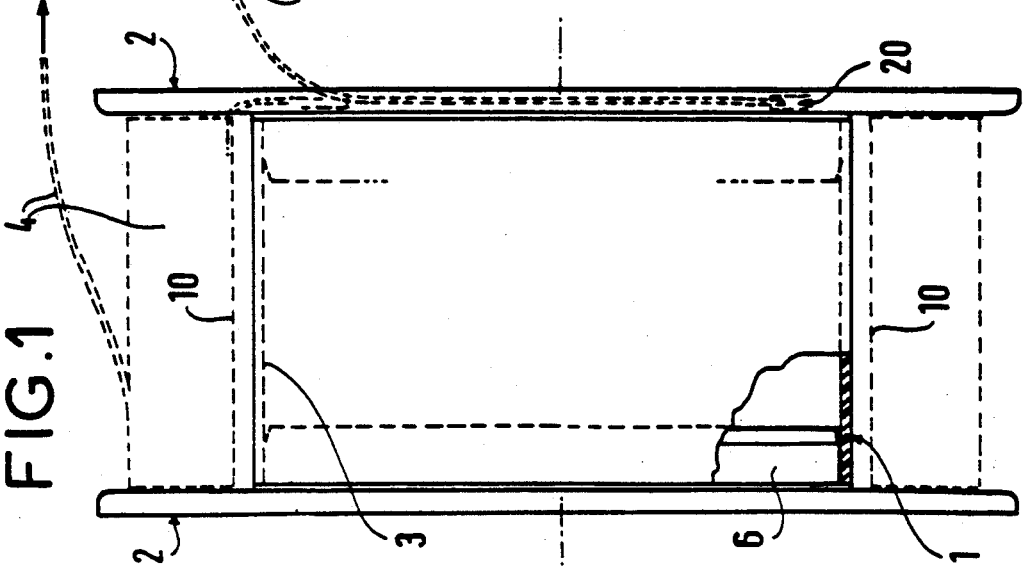
FIG. 1 is an elevation view of a reel of the present invention.

The reel shown in FIGS. 1 to 3 comprises three parts, namely a tubular core 1 and two identical end plates 2. The end plates 2 fit into the bore 3 of the core at respective ends thereof and are fixed to the core. The core receiving the two end plates is of a length chosen as a function of the desired storage capacity for a conductor 4 wound on the core between the two end plates.

The resulting reel is particularly well adapted for storing a long length of optical fiber. Its three parts are made separately from each other. They are easily assembled and they are made of a material compatible with the product to be wound on the reel. They are preferably made of a thermoplastic material, in particular acrylonitrile-butadiene-styrene, polystyrene, or polypropylene. They are assembled by any suitable method, in particular by glueing or by ultrasonic welding.

The core 1 is constituted merely by a piece of tubing. Its length is independent from the specific characteristics of the end plates, but its diameter is adapted to the specific characteristics of the end plates. At each of its ends, the core has a bevelled inside surface 5, FIG. 3, the bevel angle b being limited to one degree or a few degrees, and preferably to 1 or 2 degrees only. The length of the bevel is referenced h and is shown as being slightly greater than the length of the support 6. The outside of the core is preferably covered with a layer of foam 10, FIG. 4, of uniform thickness. The layer of foam projects slightly beyond both ends of the core 1.

Each of the two end plates 2 is obtained by molding and constitutes a flanged hub. For the purposes of assembly onto the core, an "inside" face of each end plate has a first cylindrical support 6 which fits snugly into the bore of the core, and a coaxial inner second cylindrical support 7 which delimits the spindle of the reel.

The cylindrical support 6 has gradially outside bevelled surface 8 over its end portion only. The angle c of the bevelled surface 8 is greater than the angle b of the bevelled surface 5. Angle c is chosen to be about ten degrees, e.g. 15 degrees. The length of the bevelled surface 8 is referenced d and is approximately equal to a third of the total length of the support 6 which is otherwise entirely cylindrical.

The radially outside surface of the inner support 7 is cylindrical over the entire length thereof. In addition to its bore delimiting the spindle of the reel, the inner support can receive a spacer tube 11 (as shown by the dashed lines) which is fitted and fixed thereon so as to reinforce the resulting reel and to ensure that there is no play in the spacing between the end plates.

The two supports 6 and 7 are of substantially the same length. They are interconnected by a set of uniformly-distributed axial fins 12 extending radially over the inside face of the end plate between the two supports. A set of sic fins is shown, but their number may be different. They enable internal tensions to be reduced and minimize end-plate warping. The inside edge of each of the fins is sloping, with one end of the edge being almost at the end of the support 6, and the other end being substantially halfway along the inner support 7 and forming an abutment flat 12A for the tube 11 where the said other end of the inside edge meets the inner support 7.

Around the support 6, the periphery of the end plate forms a solid flange 14. The inside face of the flange is plane except where it meets the support 6, at which point it has a shoulder 15. The width of the shoulder 15 is substantially equal to the thickness of the core 1 which, by means of its bevelled inside surface 5 of limited bevel angle, bears snugly against the shoulder 15 without the slightest gap between the core and the end plate. The height of the shoulder is preferably equal to or slightly less than the length of the end portion of the layer of foam 10 that extends beyond the core, so that the layer of foam presses snugly on the end plate, and, to be more precise, on the flange 14, at the periphery of the shoulder 15.

On the outside face of each end plate, there is a "spare-length" or reserve housing 20 obtained directly by molding and used both for storing a certain length of conductor, in particular fiber, and also for simultaneously protecting the stored length. The reserve housing 20 is delimited by a toothed ring having teeth 22 and notches 23, FIG. 2, disposed alternately and distributed uniformly around its periphery. In this example, there are six teeth 22. They are disposed between the fins 12, whereas the notches 23 are centered on the various fins.

The ring 21 and its peripheral teeth 22 are in the same plane as the outside edges of the fins 12 which connect them to the shouldered end 7A of the inner support 7 on the outside face. The teeth 22 form outside end retaining abutments delimiting the reserve housing. Their height is chosen as a function of the desired capacity of the reserve housing 20.

The bottom of the reserve housing 20 is continuous and is delimited by a circular shoulder 24 on the ring 21 at the bottom of the notches 23. The shoulder 24 corresponds to a shoulder on the outside edge of each of the fins 12. The other end wall of the housing is perforated: it is delimited by a set of tabs 25 which are inside relative to the teeth 22 and which face the notches 23 between the teeth.

The tabs 25 are situated on the truncated end portion of the outside edge of each of the fins 12 between the shoulder thereon and the inside surface of the support 6. A continuous ring 26 connects the individual tabs 25 to the inside surface of the support 6, so as to provide satisfactory overall rigidity.

On the axial outside face of the end plate 2, the flange 14 is recessed and delimited by a peripheral circular rib 31, and by a circular rib 30 substantially extending the support 6. The flange further has a set of uniformly-distributed radial ribs 32 which extend between the two circular ribs 30 and 31.

The radial ribs 32 delimit regular trapezium-shaped boxes 33 between one another and provide overall mechanical strength and rigidity. They are at an angular pitch which is a sub-multiple of the angular pitch of the fins 12. The tops of the ribs 30, 31, and 32 are situated in the plane of the toothed ring 21 so that the axial outside face is plane in spite of all the facilities provided thereon.

Advantageously, one of the above-mentioned radial ribs 32 is missing. Corresponding to this rib 32 is a double trapezium-shaped box 35 which is twice the size of the other boxes 33. This box 35 is chosen centered on one of the fins 12 and on one of the tabs 25. The end plate 2 has a hole 37 in this box 35, which hole opens out substantially onto the periphery of the shoulder 15 on the axial inside face of the flange 14. The hole 37 is delimited on either side by two curved ribs 38 which extend the rib 30 that is interrupted at the hole 37 over the height of the hole, the ribs delimiting a curved guide passage for guiding the conductor, and in particular the optical fiber, between the reserve housing 20 and the core 1. The curved passage prevents any possible break from being started in the conductor or in the optical fiber, or any other damage from being caused. The edge 37A of the hole, at the interruption in the circular rib 30, is itself rounded for the same reason.

With reference to FIGS. 2 and 4 in particular, it can be seen that the double box 35 further has a region 40 which is centered inside the box and which slightly projects from the outside of the end plate. The region 40 decompensates at least in part, for the slight imbalance in mass resulting from the missing radial rib. The region is also used for identifying or personalizing the reel, and it bears recessed etched indents 41 directly obtained by molding. The etched indents can be changed and converted on request. Naturally any other means of identification may be chosen.

The resulting reel is strong, lightweight and very cheap. It is compact to transport. It is very simple to assemble, with the bevelled surfaces ensuring that the end plates are parallel. The inside and outside radial dispositions ensure good mechanical strength, for a large storage capacity on the core, without splaying out the end plates which are nevertheless flexible enough to absorb the impact of shocks during reel handling, and which thereby act as shock absorbers relative to their central portions which form the actual framework.

Having the reserve housings 20 on both end plates ensures that the reel is entirely symmetrical. The housings do not add any noticeable cost to the manufacturing cost. Having housings 20 and identification regions on both end plates avoids any imbalance in the reel. Furthermore, the two housings enable two conductors to be stored on the core, leaving extra inside end lengths for each conductor, which extra lengths are stored separately in one or other of the housings. The extra lengths are easily stored and directly protected.

The discontinuity of the end walls of each reserve housing, and the thicknesses of the rigid fins and of the other portions of the end plates are designed and optimized as regards cost, strength and appearance.

The present invention is described with reference to the preferred embodiment shown in the drawings. Naturally, details may be changed or certain means may be replaced by other equivalent means, without going beyond the ambit of the invention.

We claim:

1. In a reel for packaging a conductor, said reel comprising a tubular core and two identical end plates assembled onto said core, each end plate being of one piece and having projecting fitting means of an axial inside one of two faces thereof fitting into a bore of the core, and said core having radially inside bevelled surfaces on an axial inside face thereof, the improvement wherein said radially inside bevelled surfaces (5) extend over end portions only of the core (1) and are of limited angle (b) lying in the range of one degree to a few degrees, and wherein said fitting means are constituted by a first cylindrical support (6) having an outside diameter substantially equal to the mean inside diameter of each of radially bevelled ends of said core, said first support (6) has only on an end portion thereof, a radially outside bevelled surface (8) of angle (c) greater than the limited angle (b) of each of the radially inside bevelled surfaces (5) of said core, and said radially inside bevelled surfaces (5) of said core (1) are each of a length (h) substantially equal to the length of said first support (6).

2. In a reel for packaging a conductor, said reel comprising a tubular core and two identical end plates assembled onto said core, each end plate being of one piece and having projecting fitting means on an axial inside one of two faces thereof fitting into a bore of the core, and said core having radially inside bevelled surfaces on an axial inside face thereof, the improvement wherein said radially inside bevelled surfaces (5) extend over end portions only of the core (1) and are of limited angle (b) lying in the range of one degree to a few degrees, and wherein said fitting means are constituted by a first cylindrical support (6) having an outside diameter substantially equal to the mean inside diameter of each of radially bevelled ends of said core, said first support (6) has only on an end portion thereof, a radially outside bevelled surface (8) of angle (c) greater than the limited angle (b) of each of the radially inside bevelled surfaces (5) of said core, and wherein each end plate (2) includes a second cylindrical support (7) axially inside and coaxial to said first support and projecting form said axially inside face of the end plate, and a set of uniformly-distributed, circumferentially spaced axial fins (12) connecting said first support to said second support.

3. A reel according to claim 2, wherein, on the axial inside face of the end plate, said axial fins (12) have inside edges thereof sloping between the supports (6, 7) and an end flat (7A) where said fins meet said second support.

4. A reel according to claim 2, wherein each end plate (2) has on the axial outside face thereof:
- a toothed ring (21) extending in the plane of outside edges of said fins (12) which connect said ring to said second support (7), and said toothed ring has teeth (22) distributed uniformly around a periphery thereof and disposed alternately with notches (23), and delimiting a first discontinuous end wall of a reserve housing (20) in said end plate;
- a continuous circular shoulder (24) on said toothed ring at a bottom of said notches, and said circular shoulder (24) constituting a bottom of said reserve housing (20) and truncates a end portion of the outside edge of each of said fins via a corresponding holder at a first support end of the fin;
- a set of radial tabs (25) on a truncated end portion of the outside edge of each of said fins, and said set constitutes a second discontinuous end wall of said reserve housing; and
- a hole (37) in said flange (14) of the end plate (2) communicating said reserve housing with the periphery of the core.

5. A reel according to claim 4, wherein, on the axial outside face of the end plate (2), said flange (14) has two circular ribs, including an inner rib (30) and a peripheral rib (31), and said circular ribs delimit said flange, and a plurality of uniformly-distributed radial ribs (32) interconnecting said two circular ribs (30, 31) and delimiting substantially trapezium-shaped boxes (33) there between, and said circular ribs and said radial ribs having tops situated int he plane of said toothed ring (21).

6. A reel according to claim 5, wherein said hole (37) in the flange is delimited on either side by two curved ribs (38) extending ends of said inner circular rib (30) which flange is interrupted over said hole.

7. A reel according to claim 5, wherein said radial ribs (32) are disposed at an angular pitch which is a sub-multiple of a pitch between said fins, forming trapezium-shaped boxes and said reel further comprises a corresponding double trapezium-shaped box (35) defined by two of said ribs (32) having an identification region (40) projecting axially form the axial outside face of the end plate.

8. A reel according to claim 7, wherein said identification region (40) comprises recessed etched indents (41).

9. A reel according to claim 7, wherein said hole (37) is formed in said double trapezium-shaped box (35) and is centered on and faces one of the tabs (25) of the second end wall of the reserve housing (20).

10. In a reel for packaging a conductor, said reel comprising a tubular core and two identical end plates assembled onto said core, each end plate being of one piece and having projecting fitting means on an axial inside one of two faces thereof fitting into a bore of the core, and said core having radially inside bevelled surfaces on an axial inside face thereof, the improvement wherein said radially inside bevelled surfaces (5) extend over end portions only of the core (1) and are of limited angle (b) lying in the range of one degree to a few degrees, and wherein said fitting means are constituted by a first cylindrical support (6) having an outside diameter substantially equal to the mean inside diameter of each of radially bevelled ends of said core, said first support (6) has only on an end portion thereof, a radially outside bevelled surface (8) of angle (c) greater than the limited angle (b) of each of the radially inside bevelled surfaces (5) of said core, and said radially inside bevelled surfaces (5) of said core (1) are each of a length (h) substantially equal to the length of said first support (6), and wherein each end plate (2) includes a second cylindrical support (7) axially inside and coaxial to said first support and projecting from said axially inside face of the end plate, and a set of uniformly distributed, circumferentially spaced axial fins (12) connecting said first support to said second support, wherein each axial end plate (2) has a radial flange (14) at the periphery of said first support (6), said radial flange being plane on a radially inside face of the and plate, except where said flange meets the first support and forms an axial inside circular abutment shoulder (15) of a width corresponding to the thickness of said core (1).

* * * * *